UNITED STATES PATENT OFFICE.

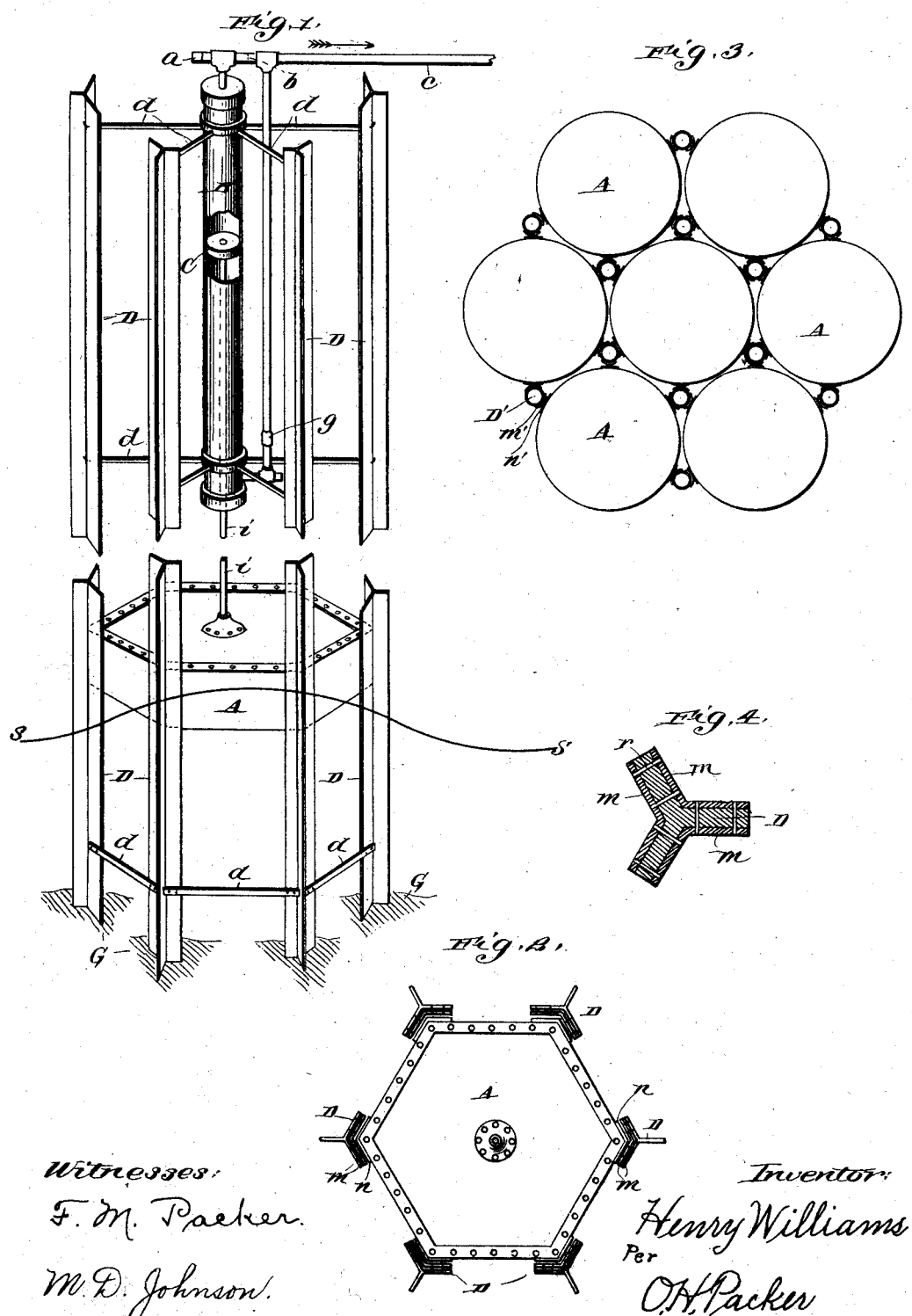

HENRY WILLIAMS, OF WILLITS, CALIFORNIA.

WAVE-MOTOR.

SPECIFICATION forming part of Letters Patent No. 706,620, dated August 12, 1902.

Application filed December 17, 1901. Serial No. 86,265. (No model.)

*To all whom it may concern:*

Be it known that I, HENRY WILLIAMS, a citizen of the United States, residing at Willits, in the county of Mendocino and State of California, have invented a new and useful Wave-Motor, of which the following is a specification.

My invention relates to wave and tide motors such as are operated by the force of the waves of lakes or oceans; and the objects of my invention are, first, to provide a self-adjusting apparatus which will work at high or low tide with high or low waves; second, to provide an apparatus in which the wearing parts can be readily replaced by new, and, third, to avoid gearing, levers, pulleys, and all mechanism commonly used to change the direction of motion. I attain these objects by the mechanism shown in the accompanying drawings, in which—

Figure 1 is a vertical perspective view of the entire machine except that two of the vertical guide-bars D are omitted to avoid confusion in the drawings; Fig. 2, a plan of the float and portions of the guide-bars; Fig. 3, a plan of a set of seven duplicate machines, each of circular form instead of hexagonal; Fig. 4, a horizontal cross-section of one of the vertical bars in the framework of the structure.

Similar letters refer to similar parts.

My invention consists, essentially, of a metallic framework or structure consisting of vertical beams or bars D and cross-braces d, within which framework the float A rises and falls with the tide or waves and to which the vertical air-pump B is secured.

Attached to the upper surface of the float A is a piston-rod i, having a piston-head C, working within the barrel B of the air-pump. As the piston-head C rises the air is forced through the check-valve b and delivery-pipe c to the air-receiver on land. (Not shown.) As the piston is rising air is entering the lower part of the cylinder B through the inlet-valve e. When the water or wave lowers, the float A will fall by gravity, the inlet-valve e and the check-valve b will close, and the piston-head C will force the air through the check-valve g and delivery-pipe c to the receiver, as before. As the piston lowers air enters the upper portion of B through inlet-valve a.

Although the float A may be of any desirable shape, I prefer to make it hexagonal, with the corners protected by replaceable buffers or friction-plates n, Fig. 2. The guide-bars D are composed of angle-iron or common iron pipe; but I prefer to use angle-iron of the form shown at D in Figs. 1, 2, and 4, as this form, together with the hexagonal form of the float, permits six duplicate machines to be arranged around a central one, thus giving a maximum strength of structure, a maximum area of float, and a minimum amount of material in the structure as a whole. The inner surfaces of these vertical bars of angle-iron D are faced with a removable angle-bar of the form m. (Shown in Figs. 2 and 4.) I prefer to make the angle-bars m and the friction-plates n of non-corrosive material. s s represent the surface of the water, and G represents the ground or sand, in which the bars D are secured or anchored.

Fig. 3 is a plan of a set of seven similar machines, the floats A being circular in form instead of hexagonal and common iron pipe D' being substituted for the angle-bars D shown in the other figures. The pipe D' can be incased with a non-corrosive pipe, or strips of non-corrosive material m' may be placed on the pipe. Friction-plates n', secured to the floats A, are designed to wear against the strips m'.

Fig. 4 is a cross-section of the three-way one-hundred-and-twenty-degree angle-bar D, used in the structure in its most desirable form. The body of the bar may be one solid piece, as shown, or it can be of three separate pieces held together by the angle-bars m, being riveted to the three strips. In any case the angle-bars m are replaceable when worn or corroded.

The advantages of my invention over wave-motors previously made are that I avoid all gearing, ratchet-wheels, belts, &c., heretofore used, thus doing away with great loss of power and motion. By using a vertical piston and air-pump I dispense with all levers, &c., for changing the direction of the force. Another advantage attained over all previous inventions of a like nature is that my device pumps air on both the rise and fall of the float and with no loss of power during the change in direction of the piston-rod, as the small valves *a b e g* close and open instantly.

I do not restrict myself to the particular method of bracing the framework, as shown, by braces *d*. Any modification of or addition to the braces *d* shown in the drawings may be employed to secure the air-pump vertically in the center of the framework. I do not restrict myself to exactly six vertical guide-bars for each float and air-pump, for, as shown in Fig. 3, each of the six duplicate machines arranged around the central one may have less than six.

What I claim as my invention, and desire to secure by Letters Patent, is—

1. The combination with a vertical, double-acting air-pump, of a vertically-movable float having non-corrosive friction-plates on the lateral sides thereof, and operating between vertical guide-bars having non-corrosive friction-strips attached thereto; said float being attached to the piston-rod of said pump, all substantially as described and for the purposes set forth.

2. The combination with a vertically-movable float adapted to operate a vertical, double-acting air-pump, of one or more other similar air-pumps and floats, the said floats being arranged to operate between several three-way vertical guide-bars D substantially as described and for the purposes specified.

HENRY WILLIAMS.

Witnesses:
J. C. BAILEY,
L. KENWORTHY.